United States Patent [19]

Moore

[11] 4,153,653
[45] May 8, 1979

[54] FUEL INDUCTION SYSTEM FOR INTERNAL COMBUSTION ENGINES

[76] Inventor: Jesse C. Moore, 309 S. Portland St., Celina, Ohio 45822

[21] Appl. No.: 840,605

[22] Filed: Oct. 11, 1977

Related U.S. Application Data

[63] Continuation-in-part of Ser. No. 460,915, Apr. 15, 1974, Pat. No. 4,053,544.

[51] Int. Cl.² .............................................. F02M 15/00
[52] U.S. Cl. .................................... 261/157; 48/180 S; 123/122 B; 123/122 F; 261/39 B; 261/50 A; 261/89
[58] Field of Search ............. 261/39 B, 50 A, 50 AA, 261/65, 69 R, 78 A, 89, 142, 145, 157; 123/122 B, 122 F, 124 R; 48/180 R, 180 S

[56] References Cited

U.S. PATENT DOCUMENTS

| | | | |
|---|---|---|---|
| 1,135,113 | 4/1915 | Hitchcock | 123/122 B X |
| 1,273,356 | 7/1918 | Good | 261/50 A X |
| 1,376,156 | 4/1921 | Murphy | 261/142 |
| 1,436,480 | 11/1922 | Collier | 123/122 B |
| 1,500,647 | 7/1924 | Shackleton et al. | 261/142 |
| 3,278,171 | 10/1966 | Carlson | 261/50 A X |
| 3,544,290 | 12/1970 | Larson, Sr. et al. | 48/180 S X |
| 3,743,258 | 7/1973 | Florentine | 261/142 |
| 3,789,817 | 2/1974 | Morel et al. | 123/122 F X |
| 3,935,290 | 1/1976 | Dickensheets et al. | 261/50 A X |

Primary Examiner—William A. Cuchlinski, Jr.
Attorney, Agent, or Firm—Jacox & Meckstroth

[57] ABSTRACT

A system for supplying fuel to an internal combustion engine for optimum efficiency in engine operation and fuel economy and for minimum objectionable exhaust emissions. The system pertains particularly to an internal combustion engine in an automobile, truck, or the like. Fuel is heated prior to introduction thereof into the engine. Fuel is introduced to the engine in accordance with intake manifold pressures.

14 Claims, 1 Drawing Figure

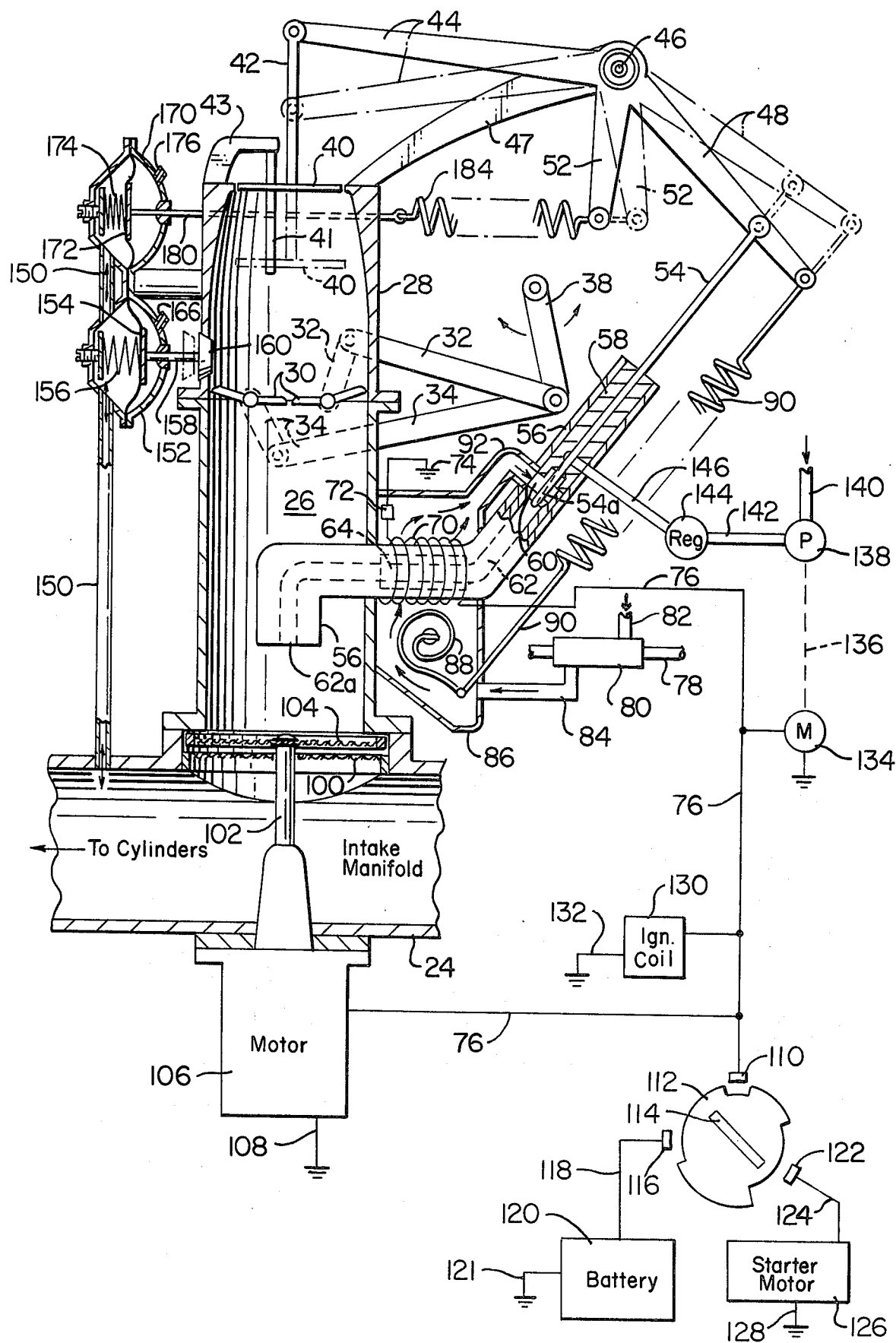

4,153,653

FUEL INDUCTION SYSTEM FOR INTERNAL COMBUSTION ENGINES

RELATED APPLICATION

This application is a continuation-in-part of patent application Ser. No. 460,915, filed Apr. 15, 1974, now U.S. Pat. No. 4,053,544.

BACKGROUND OF THE INVENTION

It is an object of this invention to provide a system for supplying fuel to an internal combustion engine in proper air-fuel ratio over a wide range of engine speeds, loads, temperatures, humidity, and other conditions.

It is another object of this invention to provide such a system by which high efficiency of engine operation may be obtained.

It is another object of this invention to provide such a system by which objectionable exhaust conditions are maintained at a minimum.

It is another object of this invention to provide means by which flow of fuel to the engine automatically ceases when the vehicle is coasting or decelerating and in which flow of fuel to the engine automatically resumes when coasting ceases.

It is another object of this invention to provide means by which fuel is introduced into an engine without the undesirable characteristics of a carburetor.

Other objects and advantages of this invention reside in the construction of parts, the combination thereof, the method of manufacture, and the mode of operation, as will become more apparent from the following description.

BRIEF DESCRIPTION OF THE DRAWING

The FIGURE of the drawing is a schematic view of a fuel induction system of this invention, showing parts broken away and in section.

DETAILED DESCRIPTION OF THE INVENTION

The fuel induction system of this invention is adapted to be associated with or in combination with an internal combustion engine, not shown. An intake manifold 24 leads to the cylinders of the internal combustion engine. Leading to the intake manifold 24 is a mixing chamber or vacuum chamber 26, within an air intake housing 28 which is joined to the intake manifold 24. Within the vacuum chamber 26 are a pair of pivotally mounted valve members 30, one of which is attached to a lever unit 32 and the other of which is attached to a lever unit 34. The lever units 32 and 34 are joined to a lever member 38, which, by means not shown, is connected to an accelerator pedal or the like of the automobile of which this mechanism is a part.

Shown at the upper portion of the air intake housing 28 is an air gate 40 which is secured to a stem 42, which is pivotally connected to an arm 44. A guide pin 41 is attached to a support member 43 and slidably extends through the air gate 40 for maintaining straight line movement thereof. The arm 44 is pivotally supported by a shaft 46, which is supported by a support member 47. An arm 48 and an arm 52 are also pivotally supported by the shaft 46. The arms 44, 48 and 52 are attached together for simultaneous movement thereof.

Pivotally attached to the arm 48 is a fuel metering rod 54 which extends into a vaporizer housing 56. The fuel metering rod 54 extends through a sealing member 58 within the vaporizer housing 56. The fuel metering rod 54 has a tapered portion 54a which is movable within a passage 60 within the vaporizer housing 56. Leading from the passage 60 within the vaporizer housing 56 is a conduit 62 which passes through a vaporizer 64, which may be of any suitable type, and may for example be of the type shown in application Ser. No. 460,915, now U.S. Pat. No. 4,053,544. The vaporizer housing 56 extends into the vacuum chamber 26, between the valve members 30 and the intake manifold 24. The conduit 62, within the vaporizer housing 56, has a discharge portion 62a, which is directed toward the intake manifold 24.

Encompassing the portion of the vaporizer housing 56 adjacent the vaporizer 64 is an electric heater coil 70 which has one end thereof joined to a thermally responsive switch 72. The thermally responsive switch 72 is also joined to a ground connection 74. The other end of the electric heater coil 70 is joined to an electric conductor 76.

An exhaust pipe 78 is shown diagrammatically and has a heat exchanger 80 in encompassing relationship thereto. The heat exchanger 80 is adapted to receive air from the atmosphere through a conduit 82. A conduit 84 leads from the heat exchanger 80 to an air housing 86. Within the air housing 86 is a thermally responsive actuator device 88 which is connected to an elongate spring 90. The elongate spring 90 is also connected to the arm 48. The air housing 86 has a conduit portion 92 which is in communication with the passage 50 within the vaporizer housing 56.

Adjacent a juncture of the air intake housing 28 and the intake manifold 24 and extending across the opening therebetween, is a fixed screen 100. Extending through the fixed screen 100 is a shaft 102 which has attached thereto a screen 104, which is rotatable with rotation of the shaft 102. The screens 100 and 104 are in closely adjacent relationship. The shaft 102 is joined to an electric motor 106 for rotation therewith. The electric motor 106 has a ground line 108 and also is joined to the electric conductor 76.

The electric conductor 76 is connected to a contact member 110, which is engageable by a switch plate or contact plate 112 which is pivotally movable by an ignition switch 114. The switch plate or contact plate 112 also is engageable with a contact member 116 which is joined by an electric conductor 118 to a battery 120. The battery 120 is also joined to ground by a terminal 121. The switch plate or contact plate 112 is also engageable with a contact member 122 which is joined by an electric conductor 124 to an engine starter motor 126. The engine starter motor 126 is also joined to ground by an electric conductor 128.

The electric conductor 76 is also connected to an ignition coil 130 which is joined to ground by a conductor 132. The electric conductor 76 is also joined to a fuel pump motor 134 which through a shaft 136 operates a fuel pump 138. The fuel pump 138 has a fuel intake line 140 connected thereto. The fuel pump 138 also has a fuel line 142 extending therefrom through a regulator 144. A fuel conduit 146 extends from the regulator 144 into the vaporizer housing 56 and is in communication with the passage 60 therewithin, through the tapered portion 54a of the fuel metering rod 54.

A fluid conduit 150 leads from the intake manifold 24 and is joined to a control housing 152. Within the control housing 152 is a diaphram 154 which is biased by a spring 156. Attached to the diaphram 154 is a stem 158 which has attached thereto a closure member 160. The closure member 160 is normally within an auxiliary opening in the wall of the air intake housing 28, between the valve members 30 and the air gate 40. The control housing 152 also has a conduit 166 which provides communication between the inside of the control housing 152 and the atmosphere.

The fluid conduit 150 also is connected to a control housing 170 which has a diaphram 172 therewithin. The diaphram 172 is biased by a spring 174. A conduit 176 provides communication between the inside of the control housing 170 and the atmosphere. The diaphram 172 has a link member 180 attached thereto for movement therewith. The link member 180 is joined to an elongate spring 184 which is also connected to the arm 52.

OPERATION

In order to start the engine which is associated with the mechanism of this invention, the ignition switch 114 is rotatively moved in a clockwise direction so that the switch plate 112 engages the contact members 110 and 116. In this position, the electric conductor 76 is energized from the battery 120, through the switch plate 112. When the electric conductor 76 is energized, the ignition coil 130, the fuel pump motor 134 and the electric heater coil 70 are energized. The fuel pump motor 134 operates at a constant rate, so that the fuel pump 138 operates at a constant rate and forces fuel through the regulator 144 at a constant pressure into the vaporizer housing 56, through the fuel conduit 146. Then the ignition switch 114 is rotatively moved further in a clockwise direction so that the switch plate 112, in addition to engaging the contact members 110 and 116, also engages the contact member 122 and energized the engine starter motor 126 for cranking operation of the engine. As stated, when the electric conductor 76 is energized, the electric heater coil 70 is energized. Thus, heat is applied to the vaporizer housing 56 and to air which passes through the air housing 86. Also, when the electric conductor 76 is energized, the electric motor 106 is energized and operates to rotate the shaft 102 and the screen 104.

As the engine cranks, a slight vacuum is generated in the intake manifold 24. Thus, through the fluid conduit 150, there is negligable vacuum on the left side of the diaphram 172 within the control housing 170. Thus, the elongate spring 184 is in a relaxed condition and permits the arms 52, 44 and 48 to move slightly in a counter-clockwise direction. When this movement of the arms 52, 44 and 48 in a counter-clockwise direction occurs, the air gate 40 is moved slightly downwardly within the air intake housing 28 to provide a greater opening to the atmosphere at the upper end of the air intake housing 28. Also, when pivotal movement of the arm 48 in a counter-clockwise direction occurs, the fuel metering rod 54 is moved in a direction from the vaporizer housing 56 and permits a large volume of fuel to flow into the passage 60 through the fuel conduit 146. Due to the fact that the thermally responsive actuator device 88, within the air housing 86, is relatively cool, the thermally responsive actuator device 88 permits the arms 52, 48 and 44 to move in a counter-clockwise direction for moving the air gate 40 downwardly to provide maximum communication between the vacuum chamber 26 and the atmosphere through the upper end of the air intake housing 28.

As soon as the engine commences to function, the ignition switch 114 is returned slightly counter-clockwise so that the contact plate 112 engages only the contact members 110 and 116. Also, as soon as the engine begins to function, normal vacuum exists within the intake manifold 24. Thus, through the fluid conduit 150 a vacuum exists on the left side of the diaphram 172 within the control housing 170 and the diaphram 172 moves toward the left, thus applying a tension upon the elongate spring 184 and pivotally moving the arm 52 in a clockwise direction. When this occurs, the air gate 40 is moved upwardly by the arm 44 to cause restriction of communication between the vacuum chamber 26 and the atmosphere, thus increasing the degree of vacuum within the vacuum chamber 26. As the arms 44, 52 and 48 move in a clockwise direction, the fuel metering rod 54 is moved further into the vaporizer housing 56, causing a restriction of fuel flow into the passage 60. As the engine operates, air is drawn into the conduit 82, through the heat exchanger 80, receiving heat from the exhaust pipe 78. The air flows through the conduit 84 into the air housing 86, through the air housing 86 and into the passage 60 within the vaporizer housing 56. Thus, heated air is available within the vaporizer housing 56 for mixture with fuel flowing into the vaporizer housing 56 through the fuel conduit 146. As the volume of fuel flowing into the passage 60 decreases, the fuel air ratio becomes "leaner". The mixed fuel and air flows from the passage 60, through the conduit 62 and from the discharge portion 62a into the vacuum chamber 26. Due to the fact that the electric motor 106 is operating, the screen 104 is rotating and the fuel and air mixture is thoroughly distributed throughout the lower portion of the vacuum chamber 26 as the fuel and air mixture flows into the intake manifold 24. As the engine continues to operate, the air flowing from the heat exchanger 80 into the conduit 84 and into the air housing 86 increases in temperature and the thermally responsive actuator device 88 operates to provide a tension upon the elongate spring 90, urging the arm 48 in a clockwise direction. Thus, the elongate spring 90 tends to move the fuel metering rod 54 inwardly with respect to the vaporizer housing 56 to reduce the volume of fuel flow. Thus, the thermally responsive actuator 88 influences the position of the fuel metering rod 54 for control of the volume of fuel flow into the passage 60 within the vaporizer housing 56.

When the air flowing through the air housing 86 reaches a predetermined temperature, the thermally responsive switch 72 opens and the electric heater coil 70 is deenergized.

When the operator of the vehicle depresses the accelerator pedal, not shown, the lever member 38 and the lever units 32 and 34 cause the valve members 30 to pivotally move toward an open position, increasing the communication between the atmosphere and the lower portion of the vacuum chamber 26, thus decreasing the degree of vacuum within the vacuum chamber 26 and decreasing the degree of vacuum within the intake manifold 24. Thus, through the fluid conduit 150 the degree of vacuum on the left side of the diaphram 172 decreases, providing less tension upon the elongate spring 184 and permitting the arms 52, 48 and 44 to move slightly in a counter-clockwise direction. Thus, the fuel metering rod 54 is moved slightly outwardly from the vaporizor housing 56, and the volume of fuel flowing from the fuel conduit 146 into the passage 60 increases, which increases the richness of the fuel and air mixture flowing into the conduit 62.

When the accelerator pedal which operates the lever 38, and the lever units 32 and 34 is only slightly depressed, the degree of vacuum within the vacuum chamber 26 is relatively high. Thus, the degree of vacuum within the intake manifold 24 and within the left portion of the control housing 170 is relatively high. Thus, the diaphram 172 moves toward the left within the control housing 170 and tension is applied to the elongate spring 184, moving the arm 52 and the arms 48 and 44 in a clockwise direction, thus, the fuel metering rod 54 is moved farther into the vaporizer housing 56, decreasing the volume of fluid flowing to the passage 60, and the fuel air mixture is somewhat "leaner".

When the vehicle of which the invention of this application is a part is coasting, for example, downhill or coasting for any other reason, the valves are in closed position, and the degree of vacuum within the intake manifold 24 is maximum. Thus, the degree of vacuum within the control housing 152 on the left side of the diaphram 154 is maximum. When this occurs, the diaphram 154 within the control housing 152 moves toward the left and the closure member 160 is moved outwardly from the air intake housing 28 and an auxiliary opening, not shown, to the atmosphere is provided in the air intake housing 28 above the valve members 30. When the closure member 160 moves to an open position, atmospheric pressure is immediately present within the vacuum chamber 26 and the differential pressure on opposed sides of the air gate 40 becomes minimal, and the air gate 40 moves to a closed position at the upper end of the air intake housing 28. Thus, the air gate 40 moves to the position shown in solid lines in a closed position, and the arms 44, 52 and 48 move in a clockwise direction. When the arm 48 moves in a clockwise direction, the fuel metering rod 54 is moved inwardly within the vaporizer housing 56 to such an extent that fuel flow from the fuel conduit 146 into the passage 60 completely ceases. Thus, there is no fuel flow into the engine during coasting operation of the vehicle.

Thus, the mechanism of this invention functions to provide optimum flow of fuel to the engine at all times. Thus, the fuel is efficiently used and the amounts of objectionable waste gases are at a minimum.

Although the preferred embodiment of the system of this invention has been described, it will be understood that within the purview of this invention various changes may be made in the form, details, proportion and arrangement of parts, the combination thereof and methods of operation, which generally stated consist in structure and methods capable of carrying out the objects set forth, as disclosed and defined in the appended claims.

The invention having thus been described, the following is claimed:

1. Mechanism for introducing fuel into an internal combustion engine having an intake manifold, a housing having a vacuum chamber in communication with the intake manifold, the vacuum chamber having a principal passage for communication with the atmosphere, a gate movable with respect to the passage for opening and closing the principal passage, valve means within the vacuum chamber for controlling communication between the intake manifold and the principal passage, control means joined to the valve means for controlling operation thereof, the combination comprising:

a vaporizer chamber in communication with the vacuum chamber, fuel control means for control of fuel flow into the vaporizer chamber, means for introducing air into the vaporizer chamber, means for heating the air which flows to the vaporizer chamber, means within the vaporizer chamber for mixing the air and the fuel flowing into the vaporizer chamber so that a mixture of air and fuel flows from the vaporizer chamber into the vacuum chamber, operator means joined to the gate and to the fuel control means for simultaneous operation thereof, and control means in communication with the vacuum chamber and operably joined to the operator means for operation thereof in accordance with the degree of vacuum in the vacuum chamber.

2. The mechanism of claim 1 in which the vaporizer chamber has a discharge portion within the vacuum chamber at a given position within the vacuum chamber, the mechanism including movable and stationary screen means between said given position and the intake manifold to provide a high degree of consistency in the distribution of the air and fuel mixture as it flows to the intake manifold.

3. The mechanism of claim 2 in which the screen means includes a pair of screen members in closely spaced relationship and in which one of the screen members is stationary and the other screen member is rotatable.

4. The mechanism of claim 1 in which the housing has an auxiliary passage leading to the vacuum chamber between the gate and the valve means, a normally closed closure member movable with respect to the auxiliary passage for opening and closing the auxiliary passage, vacuum sensing means joined to the closure member for operation thereof for opening under high vacuum conditions, and conduit means joining the intake manifold to the vacuum sensing means for operation of the vacuum sensing means in accordance with the degree of vacuum in the intake manifold.

5. The mechanism of claim 1 which includes resilient connector means joined to the operator means for operation thereof, vacuum sensing means joined to the connector means for operation thereof, and conduit means joining the intake manifold to the vacuum sensing means for operation of the vacuum sensing means and the operator means in accordance with the degree of vacuum in the intake manifold.

6. The mechanism of claim 1 which includes thermally responsive means which senses the temperature of air flowing to the vaporizer chamber, and means joining the thermally responsive means to the operator means for operation of the operator means in accordance with the temperature of the air flowing to the vaporizer chamber.

7. The mechanism of claim 1 in which the means for heating the air which flows to the vaporizer chamber includes an electrically energized heater.

8. The mechanism of claim 1 which includes an exhaust manifold, a fluid conductor having a portion encompassing the exhaust manifold and adapted to receive air from the atmosphere, the fluid conductor also having a portion encompassing the vaporizer chamber and having an outlet in communication with the vaporizer chamber, a thermally responsive control device within the fluid conductor, and means joining the thermally responsive control device to the operator means for operation of the operator means in accordance with the temperature of the air within the fluid conductor.

9. The mechanism of claim 8 which includes electric heater means in thermal transfer relationship with air in the fluid conductor for providing heat to the air within the fluid conductor.

10. The mechanism of claim 8 which includes electric heater means in thermal transfer relationship with the vaporizer chamber for providing heat to the vaporizer chamber and to the air within the vaporizer chamber.

11. The mechanism of claim 8 in which the electric heater means is in thermal transfer relationship with the air in the fluid conductor and with the vaporizer chamber for providing heat to the air within the fluid conductor and to the vaporizer chamber and to the fuel and air mixture within the vaporizer chamber.

12. The mechanism of claim 1 which includes electric heater means positioned to heat the air which flows to the vaporizer chamber, the electric heater means also being positioned to heat the air and fuel mixture within the vaporizer chamber.

13. Mechanism for introducing fuel into an internal combustion engine of the type provided with an intake manifold, a housing having a vacuum chamber in communication with the intake manifold, the vacuum chamber having a principal passage for communication with the atmosphere, a gate movable with respect to the passage for opening and closing the passage, valve means within the vacuum chamber for controlling communication between the intake manifold and said passage, the combination comprising:

a vaporizer chamber in communication with the vacuum chamber, means for introducing air into the vaporizer chamber, means for introducing fuel into the vaporizer chamber, fuel control means for controlling flow of fuel into the vaporizer chamber, operator means joining the fuel control means and the gate for simultaneous operation thereof, the housing having an auxiliary passage leading to the vacuum chamber for communication between the vacuum chamber and the atmosphere, an auxiliary closure member for opening and closing the auxiliary passage, vacuum sensing means in communication with the intake manifold and operably joined to the auxiliary closure member for operation thereof in accordance with the degree of vacuum in the intake manifold, vacuum sensing means in communication with the intake manifold, resilient means operably joining the vacuum sensing means to the operator means for operation of the operator means in accordance with the degree of vacuum in the intake manifold.

14. Mechanism for introducing fuel into an internal combustion engine of the type provided with an intake manifold, a housing having a vacuum chamber in communication with the intake manifold, the vacuum chamber having a principal passage for communication with the atmosphere, a gate movable with respect to the passage for opening and closing the passage, valve means within the vacuum chamber for controlling communication between the intake manifold and said passage, the combination comprising:

a vaporizer chamber in communication with the vacuum chamber, means for introducing air into the vaporizer chamber, means for introducing fuel into the vaporizer chamber, fuel control means for controlling flow of fuel into the vaporizer chamber, operator means joining the fuel control means and the gate for simultaneous operation thereof, the housing having an auxiliary passage leading to the vacuum chamber for communication between the vacuum chamber and the atmosphere, an auxiliary closure member for opening and closing the auxiliary passage, vacuum sensing means in communication with the intake manifold and operably joined to the auxiliary closure member for operation thereof in accordance with the degree of vacuum in the intake manifold, vacuum sensing means operably joined to the operator means and in communication with the intake manifold for operation of the operator means in accordance with the degree of vacuum in the intake manifold, means for heating the air which is introduced into the vaporizer chamber comprising an exhaust manifold and fluid conduit means in communication with the exhaust manifold and the vaporizer chamber, thermally responsive actuator means within the fluid conduit means and operably joined to the operator means for operation of the operator means in accordance with the temperature of the fluid within the fluid conduit means.

* * * * *